United States Patent [19]

Hall et al.

[11] Patent Number: 4,682,759
[45] Date of Patent: Jul. 28, 1987

[54] RELIEF VALVE FOR HYDRAULIC SYSTEMS

[75] Inventors: Charles B. Hall, Ingleside; Martin J. Mondek, Wonder Lake, both of Ill.

[73] Assignee: Outboard Marine Corporation, Waukegan, Ill.

[21] Appl. No.: 543,947

[22] Filed: Oct. 20, 1983

[51] Int. Cl.⁴ ............................................. F16K 1/36
[52] U.S. Cl. .................................... 251/210; 251/332; 251/356
[58] Field of Search ............... 251/356, 332, 210, 333, 251/334; 431/344; 137/242

[56] References Cited

U.S. PATENT DOCUMENTS

| | | |
|---|---|---|
| 2,075,167 | 3/1937 | Broecker ......................... 251/356 X |
| 2,654,560 | 10/1953 | Smith .................................... 251/332 |
| 2,959,392 | 11/1957 | Von Platen et al. . |
| 2,968,464 | 1/1961 | Olson ............................. 251/332 X |
| 2,995,057 | 8/1961 | Nenzell ........................... 251/332 X |
| 3,007,488 | 7/1959 | Wheeler, Jr. . |
| 3,265,353 | 8/1966 | Varga . |
| 3,705,785 | 12/1972 | Goto .................................... 431/344 |
| 3,945,607 | 3/1976 | Dashner . |
| 4,153,233 | 5/1979 | Neyret ............................. 251/353 X |
| 4,211,386 | 7/1980 | Yocum et al. .................. 251/210 X |
| 4,478,570 | 10/1984 | Johansson ......................... 431/344 |

FOREIGN PATENT DOCUMENTS

| | | |
|---|---|---|
| 661054 | 11/1951 | United Kingdom . |
| 685087 | 12/1952 | United Kingdom ................ 251/141 |
| 686404 | 1/1953 | United Kingdom . |
| 1213100 | 11/1970 | United Kingdom . |
| 2017267A | 3/1979 | United Kingdom . |
| 2026137A | 6/1979 | United Kingdom . |

Primary Examiner—Arnold Rosenthal
Attorney, Agent, or Firm—Michael, Best & Friedrich

[57] ABSTRACT

A soft rubber seal member is molded in the cavity in the face of the valve core. During the molding process air can escape through the slots or gates in the annular ring in the face of the valve core. When rubber starts coming out the gate, the gates are closed off and the rubber hardens in the gates. The valve is used in combination with a valve housing provided with an entry orifice having a diverging exit section leading to a flat annular surface against which the flat central portion of the soft rubber seal will seat when the valve is closed. This obtains a large seating area and ensures uniform valve opening pressure.

7 Claims, 5 Drawing Figures

RELIEF VALVE FOR HYDRAULIC SYSTEMS

FIELD OF THE INVENTION

This invention relates to a valve having a soft seal or face. Such valves are typically used in hydraulic systems, but the invention is not so limited.

BACKGROUND OF THE INVENTION

Soft seat valves are relatively insensitive to contamination and leakage. Therefore, they are the most frequently used valves in hydraulic systems. The valve has a metallic valve core and a soft rubber seat (or insert). The soft rubber is molded in a cavity in the face of the valve core. Prior to molding a bonding agent is applied to the cavity. The quality of the bond is reduced if air is entrapped during the molding process or if the bonding agent is washed out during the process. Either defect causes voids in the seal between the valve core and the soft rubber. This leads to localized stress and results in premature valve failure.

A flat face on the soft rubber seating against a flat metallic surface on the valve housing has not been successful since the design leads to considerable variation in the pressure at which the valve opens. Better control of the opening pressure is obtained by dishing the face of the soft rubber seal but the thin perimeter of the seal has a very short service life.

SUMMARY OF THE INVENTION

An object of this invention is to provide a valve having a face having a cylindrical cavity in which a soft rubber seal member is fixed, an annular ring surrounding the cavity, the seal having a central portion projecting axially beyond said ring and having an annular slot between said central portion and the seal perimeter which terminates in the plane of the ring. The slot permits the rubber in the central portion of the seal member to deflect into the slot space.

A further aspect of this invention is to provide such a valve with slots or molding gates in the annular ring to permit air to exit through the gates during the molding proccess.

Still another object of this invention is to provide the aforesaid valve in combination with a housing in which the exit section of the orifice leading to the valve diverges and terminates in an annular flat surface against which the central portion of the seal member will seat. This ensures a good seating area and provides uniform opening pressure comparable to the dished seat.

A further feature of the invention is to provide a valve assembly including a valve housing having a flat seat, a valve mounted in the housing for movement toward and from said seat. The valve has a cavity in the valve face and a soft rubber seat fixed in the cavity with a projecting flat surface. An orifice in the valve housing has a diverging exit. The seal member seats on the annular portion of said seat around the exit.

Figure 1:
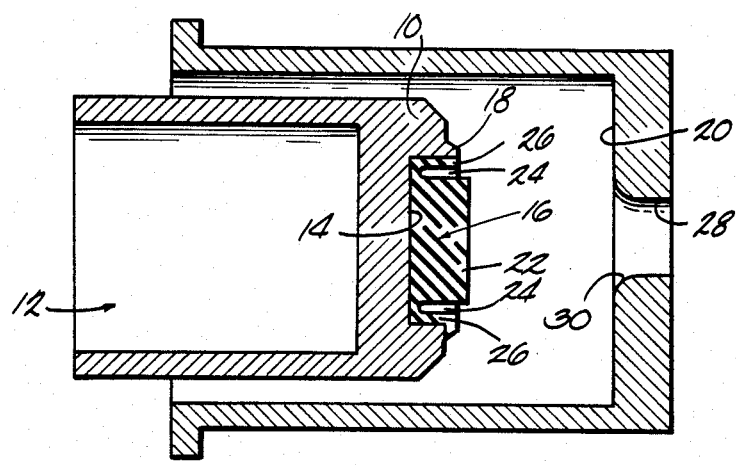
FIG. 1 is a section to a valve and valve housing with a valve in the open position.

This invention is not limited to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DETAILED DESCRIPTION OF THE DRAWINGS

The face 10 of the valve core 12 has a recessed pocket 14 in which a soft rubber seal 16 is molded. The face has an annular ring 18 surrounding the pocket. This ring will seat against the flat valve housing seat 20 when the valve is closed. When the valve is closed a projecting central portion 22 of the soft rubber seal is compressed and deflected so that the perimeter of the central portion will deflect into the relief area formed by the slot 24 molded into tne seal inside the perimeter 26 of the seal which has the same axial extent as the pocket.

Figure 2:
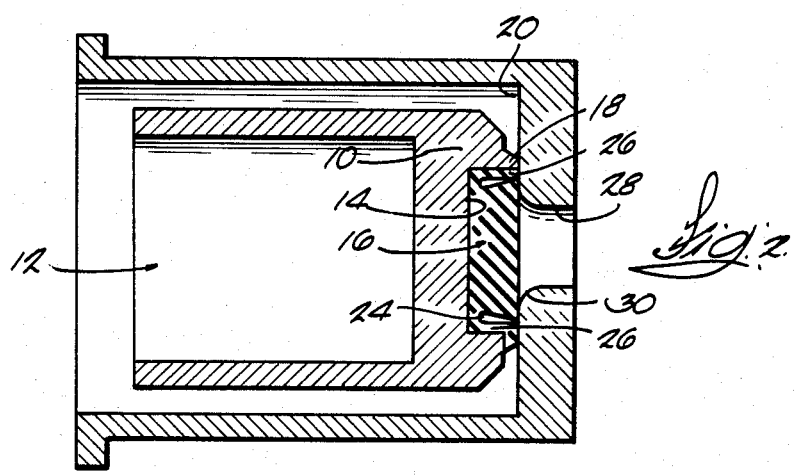
FIG. 2 is similar to FIG. 1, but shows the valve closed.
Figure 4:
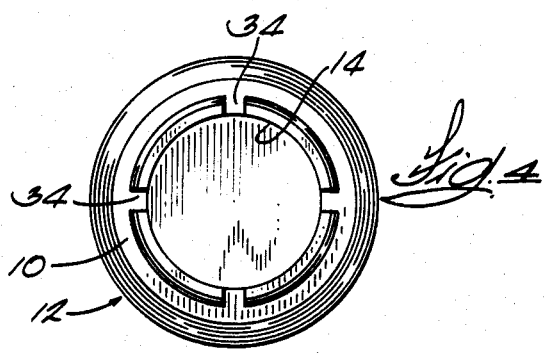
FIG. 4 is a plan view of the valve core shown in FIG. 3.

It will be noted the orifice 28 in the valve housing has a radiused or diverging section 30. This can be a true radius or can be any curve deemed appropriate to the particular design. The maximum diameter of the orifice at the exit of the radiused section 30 is less than the diameter of the central portion 22 of the soft rubber seal so there is an annular surface on a housing seat 20 against which the soft rubber seal will rest when the valve is closed. Actually, there will be an additional annular space picked up as the seal deflects as shown in FIG. 2. This arrangement has been found to give substantially the same performance as the dished seal mentioned above as giving uniform opening pressure. But, the present construction has a long life while the dished valve face has a very short life. The present construction results in a greatly improved control of the opening pressure of the valve, that is, the pressure at which the valve will open is more uniform.

Figure 3:
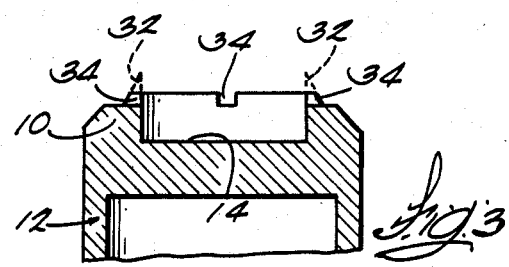
FIG. 3 is a detailed view of the valve core prior to molding the soft rubber seal.
Figure 5:
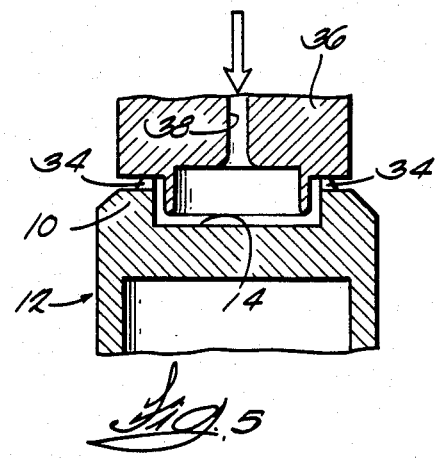
FIG. 5 is a detail of the position of the valve core and the molding dye.

As indicated earlier, there are two problems in the prior art involving defects developed in the molding process, one being air entrapment, and the other being washing the bonding agent out of the pocket while the rubber is being injected into the pocket. The present design overcomes both problems. The annular ring 18 which serves as a limit stop when the valve closes (as illustrated in FIG. 2) initially projects to a point as shown in dotted lines 32 (FIG. 3) and is provided with a plurality of gates (slots) 34 in the ring. The number and the width of the gates is determined by trial and error. The purpose is to allow rubber to flow out of the pocket during the molding operation.

Before rubber is injected into the pocket, the molding die 36 is brought down against the pointed ring 32 and the die is pressed down with great force until the parts are spaced correctly. During this operation the pointed portion of the ring is crushed so as to insure a tight seal at this point and avoid getting rubber on the ring surface. When the rubber is injected through the sprue opening 38 the rubber is far enough from the bottom of the pocket to avoid impinging on the bottom with such velocity as to wipe off or blow away the bonding agent previously applied to the pocket. The gates allow the air in the pocket to escape and insure a complete fill of the pocket. Since the molding die 36 has been accurately located relative to the valve core (indeed, to the point of crushing the ring) the axial extent of the central portion 22 of the soft rubber seal 16 is accurately determined. When rubber starts flowing out of the gates, the gates are closed and the rubber is allowed to harden in the gates. When the molding is completed, the rubber in the gates and the annular ring 18 form a continuous surface, and the ring serves primarily as a limit stop for the valve core when the valve is closing. The ring also serves to back up the rubber portion 26 on the outside of the slot 24 and serves to prevent extreme deflection of the central portion of the valve seal to the point where it could be trapped between the ring and the housing seat which would, of course, damage the seal.

We claim:

1. A valve assembly comprising a valve member including a face having therein a cylindrical cavity, said face defining an annular ring around said cavity, and a soft rubber seal member fixed in said cavity, said seal member being generally in the form of a solid geometric cylinder having an end face with a central portion which projects axially beyond said annular ring and has a flat circular sealing surface, with an outer annular portion having a surface in approximately the same plane as said annular ring, and with an annular slot between said central portion and said outer annular portion permitting deflection of said seal member into the space otherwise defined by said slot.

2. A valve assembly according to claim 1 and further including a valve housing having a flat seating surface extending in facing relation to said valve member for seating engagement by said central portion of said seal member, said seating surface having centrally therein an orifice with an exit portion diverging in the direction toward said valve member, said exit portion having a maximum diameter less than the diameter of said central portion of said seal member, whereby said central portion of said seal member has an annular seating area.

3. A valve assembly according to claim 2 wherein said seating area is substantially flat.

4. A valve assembly according to claim 1 wherein said ring includes a slot extending radially therein, and wherein said seal member extends into said slot.

5. A valve assembly comprising a valve housing including a flat seat having centrally therein an orifice with a diverging exit, and a valve member mounted for movement toward and from said seat, said valve member including a face having therein a cavity having an annular side wall, and a soft rubber seal member which is fixed in said cavity, which is partially in the form of a solid geometric cylinder having an annular wall spaced inwardly from said annular wall of said cavity, which has a flat circular sealing surface constituting one end of said solid cylinder and projecting beyond said face, and which has a diameter greater than the maximum diameter of said diverging exit, whereby to provide sealing engagement around said exit between said seat and an annular portion of said sealing surface.

6. A valve assembly comprising a valve member including a face having therein a cylindrical cavity, said face defining an annular ring around said cavity, a soft rubber seal member fixed in said cavity, said seal member being generally in the form of a solid geometric cylinder, having a central portion which projects axially beyond said annular ring and has a flat circular sealing surface, having an outer annular portion with a surface in approximately the same plane as said annular ring, and having an annular slot between said central portion and said outer annular portion permitting deflection of said central portion of said seal member into the space otherwise defined by said slot, and a valve housing having a flat seating surface extending in facing relation to said valve member for seating engagement by said central portion of said seal member, said seating surface having centrally therein an orifice with an exit, said exit having a maximum diameter less than the diameter of said central portion of said seal member, whereby said central portion of said seal member has an annular seating area.

7. A valve assembly comprising a valve housing including a flat seat having centrally therein an orifice with an exit, and a valve member mounted for movement toward and from said seat, said valve member including a face having thereing a cavity having an annular side wall, and a soft rubber seal member which is fixed in said cavity, which is partially in the form of a solid geometric cylinder having an annular wall spaced inwardly from said annular wall of said cavity, which has a flat circular sealing surface constituting one end of said solid cylinder and projecting beyond said face and adapted to engage said flat seat around said orifice exit, and which has a diameter greater than the maximum diameter of said exit, whereby to provide sealing engagement around said exit between said seat and an annular portion of said sealing surface.

* * * * *